US011484134B1

(12) United States Patent
Reynolds (10) Patent No.: US 11,484,134 B1
(45) Date of Patent: Nov. 1, 2022

(54) MOBILE DISPLAY

(71) Applicant: Michael Edward Reynolds, St. Peters, MO (US)

(72) Inventor: Michael Edward Reynolds, St. Peters, MO (US)

( * ) Notice: Subject to any disclaimer, the term of this patent is extended or adjusted under 35 U.S.C. 154(b) by 150 days.

(21) Appl. No.: 17/099,132

(22) Filed: Nov. 16, 2020

Related U.S. Application Data

(60) Provisional application No. 62/939,743, filed on Nov. 25, 2019.

(51) Int. Cl.
| | |
|---|---|
| *A47F 5/13* | (2006.01) |
| *A47F 7/16* | (2006.01) |
| *A47F 7/024* | (2006.01) |
| *A47F 7/14* | (2006.01) |
| *G09F 5/04* | (2006.01) |
| *B62B 3/00* | (2006.01) |

(52) U.S. Cl.
CPC ............ *A47F 5/137* (2013.01); *A47F 7/0246* (2013.01); *A47F 7/146* (2013.01); *A47F 7/163* (2013.01); *B62B 3/005* (2013.01); *G09F 5/04* (2013.01); *G09F 2005/045* (2013.01)

(58) Field of Classification Search
CPC ........ A47F 5/108; A47F 5/137; A47F 7/0246; A47F 7/163; A47F 7/146; A47F 7/024; A47F 7/16; A47F 7/18; B62B 3/005; G09F 2005/045; G09F 5/04; B42F 17/02; B42F 13/04; B42F 15/007; B42F 17/16; E05B 73/0005; E05B 73/0017; E05B 73/0023; E05B 73/0082

USPC ............................ 211/46, 4, 10, 11; 280/79.3
See application file for complete search history.

(56) References Cited

U.S. PATENT DOCUMENTS

| | | | | |
|---|---|---|---|---|
| 1,881,614 A | * | 10/1932 | Irving | B42F 17/32 211/11 |
| 2,485,519 A | * | 10/1949 | Wardyharrya | B42F 17/02 211/11 |
| 2,583,514 A | * | 1/1952 | Maslow | B62B 3/182 280/33.996 |
| 3,094,216 A | * | 6/1963 | Gordon | A47F 7/163 211/45 |
| 3,281,193 A | * | 10/1966 | Murray | B42F 15/0094 312/321 |
| 3,339,938 A | * | 9/1967 | Edmisson | B25H 3/06 248/145 |
| 3,472,387 A |  | 10/1969 | Olsen | |
| 3,630,387 A | * | 12/1971 | Wehner | B42F 15/0094 211/195 |
| 3,965,583 A |  | 6/1976 | Price | |

(Continued)

*Primary Examiner* — Jennifer E. Novosad
(74) *Attorney, Agent, or Firm* — Creativenture Law, LLC; Kevin C. Staed; Dennis J M Donahue, III (57) ABSTRACT

A mobile display cart for storing flooring panels that can be quickly removed and displayed on a floor. The mobile display includes a base supported on a frame with a set of wheels allowing the display to be wheeled to varying locations. The base includes a series of baffles with one or more flooring panels situated within a baffle wherein the panels remain substantially upright when held within the cart. In addition, a cord is connected to one end of the cart and strings through holes within each panel allowing one or more panels to be removed from the basket and displayed on the floor around the cart. However, the cord prevents the panels from being taken away from the display.

20 Claims, 6 Drawing Sheets

(56) References Cited

U.S. PATENT DOCUMENTS

| | | | | |
|---|---|---|---|---|
| 4,069,919 A * | 1/1978 | Fernbaugh | E05B 69/006 | 340/568.8 |
| 4,212,175 A * | 7/1980 | Zakow | E05B 73/0005 | 70/58 |
| 4,231,175 A * | 11/1980 | Baxter | B42F 17/06 | 220/543 |
| 4,260,063 A * | 4/1981 | Bennett | E05B 69/006 | 211/124 |
| 4,390,100 A * | 6/1983 | Petron | B42F 7/00 | 211/11 |
| 4,460,093 A * | 7/1984 | Otema | E05B 73/0005 | 70/59 |
| 4,598,827 A * | 7/1986 | Keifer | E05B 69/006 | 70/59 |
| 4,616,756 A * | 10/1986 | Holtz | B62B 3/00 | D34/21 |
| 4,682,697 A | 7/1987 | Cohen | | |
| 4,790,440 A * | 12/1988 | Leszczak | F16M 11/08 | 211/11 |
| 4,872,580 A * | 10/1989 | Fuller | A47F 7/163 | 211/11 |
| 4,901,867 A * | 2/1990 | Petty, Jr. | B42F 15/0094 | 312/184 |
| 4,938,364 A | 7/1990 | Stadelman et al. | | |
| 4,943,029 A * | 7/1990 | Szuster | A47F 5/13 | 211/181.1 |
| 4,974,733 A * | 12/1990 | Evans | A47B 63/00 | 211/11 |
| 5,027,956 A * | 7/1991 | Lotufo | A47F 7/163 | 211/50 |
| 5,069,347 A * | 12/1991 | Newman | G11B 33/0433 | |
| 5,154,072 A * | 10/1992 | Leyden | E05B 69/006 | 70/59 |
| 5,226,656 A * | 7/1993 | Mayer | E04F 21/0023 | 280/47.16 |
| D341,459 S * | 11/1993 | Yang | D34/21 | |
| 5,351,507 A * | 10/1994 | Derman | E05B 73/0005 | 248/553 |
| 5,358,125 A * | 10/1994 | Blessing | A47B 88/931 | 211/189 |
| 5,396,996 A * | 3/1995 | Box | B65D 25/06 | 220/543 |
| D366,744 S * | 1/1996 | Bailey | D34/12 | |
| 5,558,359 A * | 9/1996 | Phears | B62B 3/12 | 280/654 |
| 5,620,193 A | 4/1997 | Dschaak | | |
| 5,649,718 A | 7/1997 | Groglio | | |
| 5,685,436 A * | 11/1997 | Davet | A47F 7/024 | 211/85.5 |
| 5,718,441 A | 2/1998 | Kern et al. | | |
| 5,762,211 A * | 6/1998 | Ensign | A47F 5/0861 | 211/70.6 |
| D404,873 S * | 1/1999 | Simons | D34/21 | |
| 5,890,604 A * | 4/1999 | Heinz | A47F 7/163 | 312/184 |
| 6,105,922 A * | 8/2000 | Derman | E05B 73/0005 | 248/205.3 |
| 6,286,689 B1 * | 9/2001 | Sherwood | A47F 7/163 | 211/195 |
| 6,508,376 B1 * | 1/2003 | Chiang | B42F 15/0094 | 220/6 |
| 6,604,390 B1 * | 8/2003 | Nooner | A47G 29/20 | 70/30 |
| 6,829,916 B1 * | 12/2004 | Devecki | B63C 11/02 | 70/58 |
| 7,258,352 B2 * | 8/2007 | Odgers | B62B 1/266 | 280/654 |
| 7,517,028 B2 * | 4/2009 | Hand | B42F 15/007 | 206/425 |
| 8,360,474 B2 * | 1/2013 | Lurie | B62B 1/14 | 280/814 |
| 8,752,848 B2 * | 6/2014 | Petrick | B62B 3/004 | 280/47.35 |
| 10,334,969 B1 | 7/2019 | Roan et al. | | |
| 2004/0201190 A1 * | 10/2004 | Gloger, Jr. | G06F 1/189 | 280/79.3 |
| 2005/0016939 A1 * | 1/2005 | Eby | B42F 17/18 | 211/11 |
| 2005/0098509 A1 * | 5/2005 | Benn | B42F 7/10 | 211/11 |
| 2005/0173355 A1 * | 8/2005 | Stravitz | B42F 17/20 | 211/11 |
| 2008/0035778 A1 * | 2/2008 | Belden | B65H 75/446 | 242/375 |
| 2012/0103031 A1 * | 5/2012 | Grant | E05B 67/36 | 70/14 |
| 2021/0242644 A1 * | 8/2021 | Sun | H01R 31/06 | |
| 2021/0317687 A1 * | 10/2021 | Wyler | G08B 3/10 | |

* cited by examiner

MOBILE DISPLAY

CROSS-REFERENCE TO RELATED APPLICATIONS

This application claims priority from U.S. Provisional Patent Application No. 62/939,743 filed on Nov. 25, 2019, which is hereby incorporated by reference.

STATEMENT REGARDING FEDERALLY SPONSORED RESEARCH

Not Applicable.

APPENDIX

Not Applicable.

BACKGROUND OF THE INVENTION

Field of the Invention

The present invention relates to product displays, and more particularly to mobile displays for flooring samples.

Related Art

Product displays have long been used in retail store settings to show prospective purchasers various products. In particular, displays have been used within flooring stores to show clients floor panels, such as carpet, wood and tile. Conventional displays typically include various small flooring samples that show different flooring patterns, styles, materials and other variations of color which are available. In this manner, the customer can review a large selection of flooring samples and can even take selected samples home to determine how they might fit in with their home decor.

In one display variation, flooring samples are carried in a binder. Flooring samples are secured to the binder with adhesives, posts or bolts in a book-like arrangement allowing the buyer to flip through the binder to view various flooring options. However, binders are heavy and difficult to maneuver. In addition, flooring samples within the binder are not readily removed to allow the buyer to view the flooring sample on the floor, away from the other samples or outside the profile of the binder. Further, if the binder is unbound to release a sample, a buyer may leave with the sample and effectively render the display incomplete.

Another flooring display commonly used in traditional flooring retail stores include mounting floor samples to a single board or wall. However, floor samples that are permanently affixed to a wall or board deprive the prospective purchaser of the opportunity to handle the samples, view them on the floor or position them next to complimentary pieces, such as another floor type, threshold piece or trim.

Other displays can be free standing racks or movable displays with multiple flooring samples positioned thereon. For example, U.S. Pat. No. 4,938,364 describes a wheeled base which supports a vertical spindle upon which presentation flooring displays are mounted. Although mobile, this display system still does not allow a prospective purchaser to hold the sample and place it on the floor for viewing. Conversely, other displays merely hold loose samples that can be taken down by a customer. Although effective at displaying samples that can be felt, moved and easily viewed by customers, these displays with unattached samples are undesirable wherein customers can easily walk off with a single panel that makes up a larger display. In such a case, the display is incomplete.

U.S. Pat. No. 4,872,580 describes another display device which uses sloping baffles that form slots to receive various flooring samples to and display them in a shingled pattern. This device allows the display pieces to be removed from the display with undue effort but a problem remains as a purchaser can easily walk away with a sample, rendering the display incomplete.

Accordingly, there has been a desire for an improved display device in the flooring industry. In particular, it is a desire to provide a mobile display that can be moved around from location to location while allowing a customer to grab, move and arrange flooring panels from the display for easier viewing. However, it is also a desire that the improved display include a locking device that prevents a customer from walking off with the panel where the panels supported by the display cannot be easily separated without the permission and assistance of a sales associated.

SUMMARY OF THE INVENTION

The invention described herein is a mobile display cart for storing flooring samples that can be quickly removed and displayed on a floor. The mobile display includes a base supported on a frame with a set of wheels allowing the display to be wheeled to varying locations. The base includes sidewalls around the perimeter to form a basket shape and a series of baffles on the topside of the base to allow one or more flooring samples to stand substantially upright in the slot between each baffle. In addition, a cord is connected to one end of the base or frame and strings through holes within each flooring sample to allow the flooring samples to be removed from the basket and displayed on the floor around the display while still being connected thereto. Thus, the cord prevents the flooring samples from being taken away from the display.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The mobile display described herein allows flooring samples to be displayed in a movable cart such that the sample panels can be quickly removed and displayed on the floor around the mobile display and subsequently stored back in the display when viewing is complete. The mobile display in the preferred embodiment includes a base supported on a frame with a set of wheels that allow the display to be wheeled to varying locations within a retail store location. To assure that panels are not inadvertently separated from the cart yet allow the panels to be removed therefrom, a cord is fixed to one end of the cart and connects to the panels stowed on the base of the cart. In the preferred embodiment described herein, the length of the cord extends through holes within each panel such that one or more panels can be removed from the cart and arranged on the floor around the display but cannot be removed from display all together without first disconnecting the panel from the cord. Further, to provide easier viewing when the panels are stowed, a series of alignment baffles may be provided on the topside of the base with one or more panels being situated in the slot between adjacent baffles so that the samples remain substantially upright atop the base.

Figures 3A, 3B, 3C:
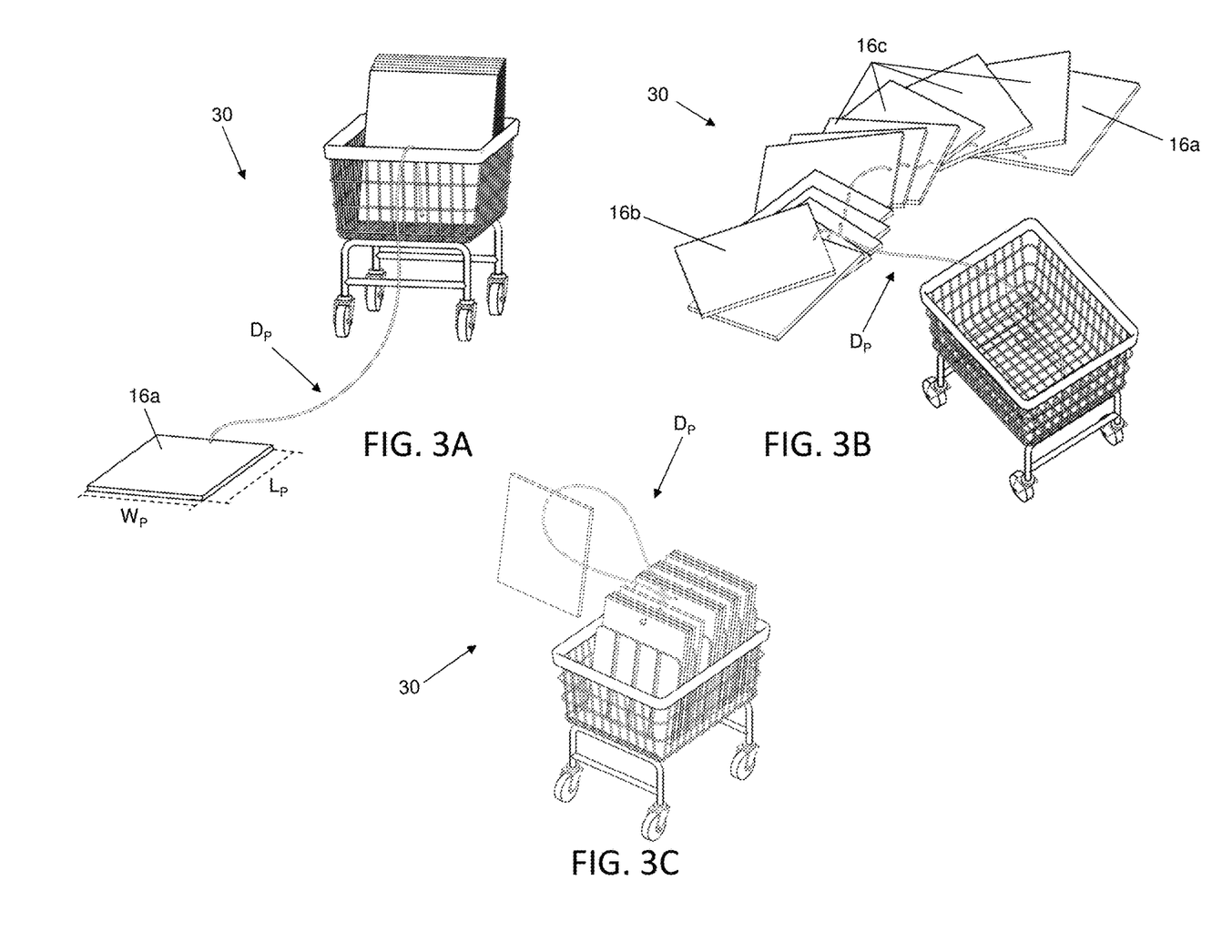
FIGS. 3A-3C respectively show panels displayed around the mobile display according to the invention described herein.
Figure 5:
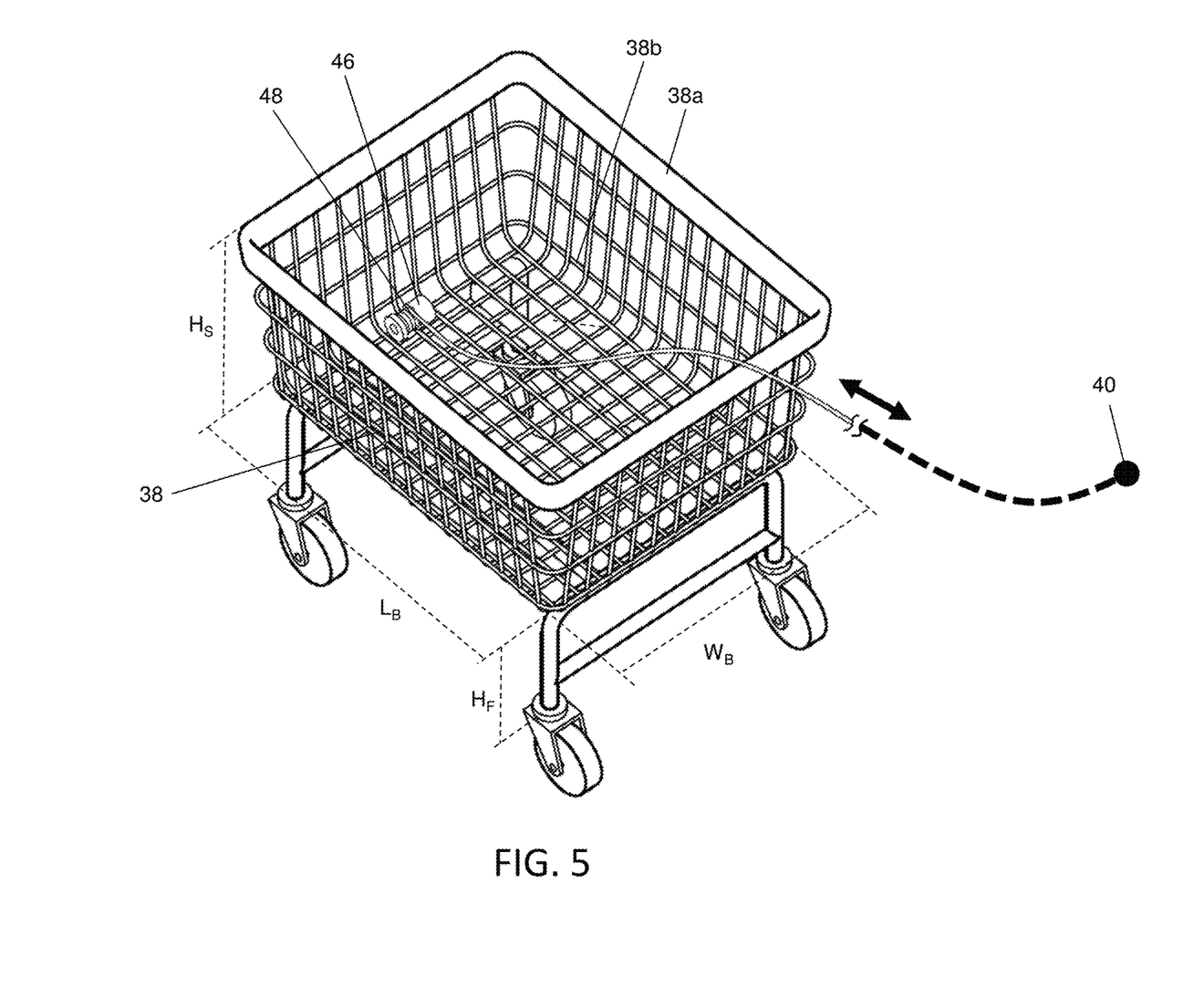
FIG. 5 illustrates the cord recoil assembly according to the invention described herein.

The mobile display 10 includes a frame 12 with a set of casters 20 attached to a lower section 22b opposite from the base connected to the upper section 22a, as illustrated in FIG. 5. The frame includes a height ($H_F$) between the lower section connected to the casters and the upper section connected to the base. As further explained herein, it is an aspect of the invention to allow the panels to be removed from the base and positioned around the cart. Accordingly, the height of the frame is necessarily less than the cord length to allow one or more of the panels to reach the ground around the cart, as shown in FIGS. 3A-3C.

The base 14 includes a substantially planar surface connected to the upper section of the frame on the bottom side 26b and a top side 26a that supports the panels when stowed. The base also includes a length ($L_B$) and a width ($W_B$) within a perimeter 24. Although the base may be sized and shaped to hold various panel sizes and shapes, the preferred embodiment shown and described herein is a rectangular shape with the length of the base being greater than the width. Further, the preferred base includes sidewalls 38 extending a height ($H_S$) from a bottom edge 38b connected along the perimeter of the base to the top edge 38a which thereby create a rectangular basket for supporting the panels.

The base and sidewalls are preferably made from a wire mesh material with the panels within the basket being at least partially viewable through the wire mesh sidewalls. Accordingly, a customer in a showroom can at least see a small portion 58 of the panels through the sidewalls of the basket even when they are stowed. In an alternative embodiment, the basket sidewalls and base may be made from other materials, but it is preferred that the material be at least partially transparent, such as acrylic glass or another similar material. Further, the frame is preferably made from light weight tubing and generally includes a set of legs with at least one longitudinal support connecting the legs to one another.

Figure 1A:
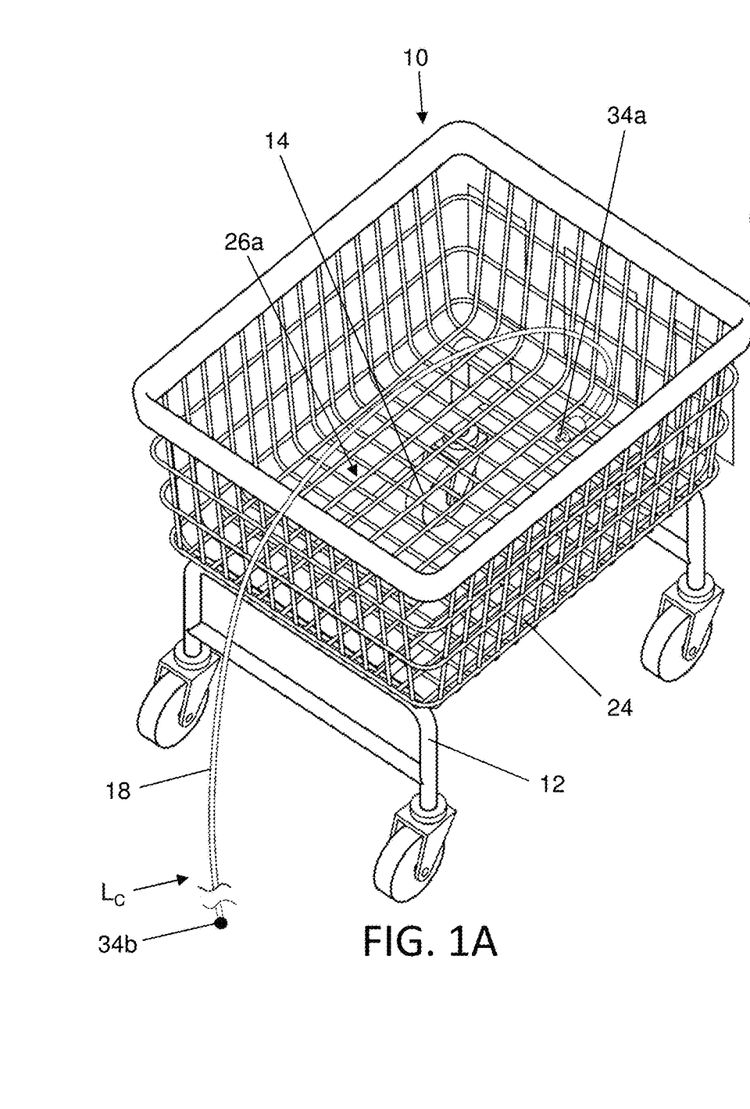
FIGS. 1A and 1B show the mobile display according to the invention described herein.
Figure 1B:
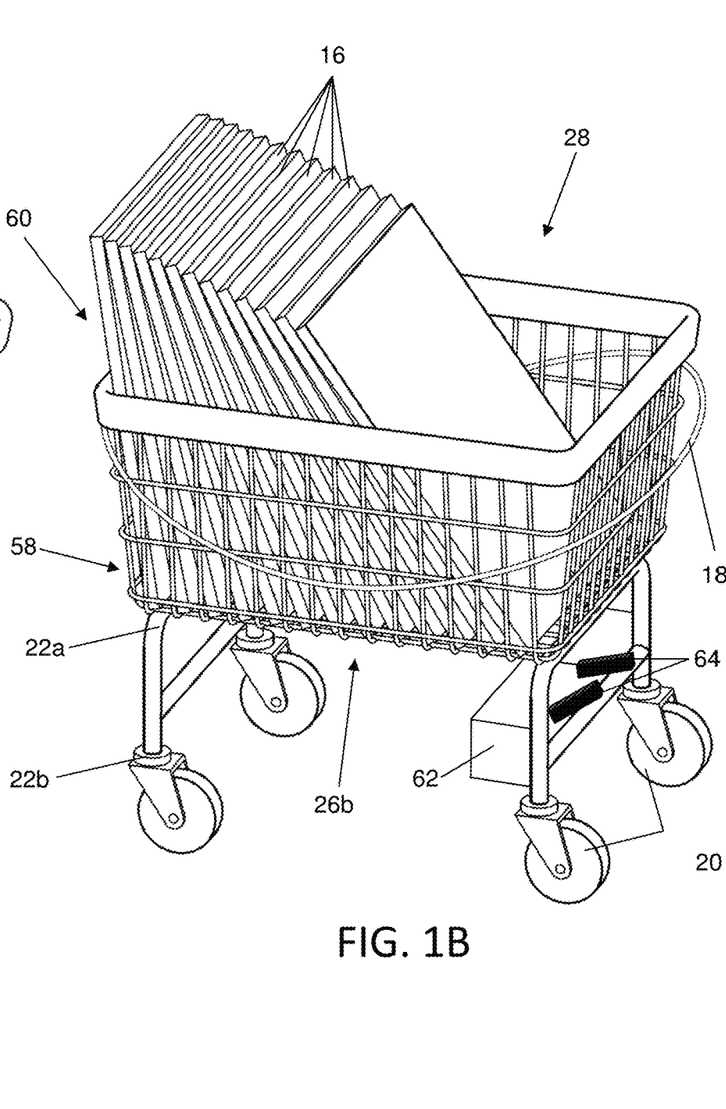
Figure 6A:
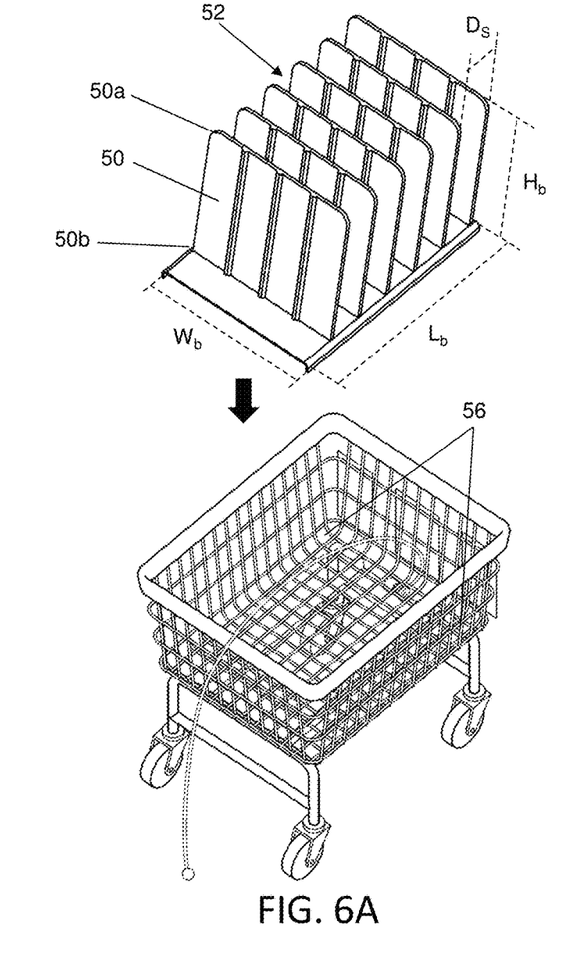
FIGS. 6A and 6B depict a mobile display with baffles according to the invention described herein.
Figure 6B:
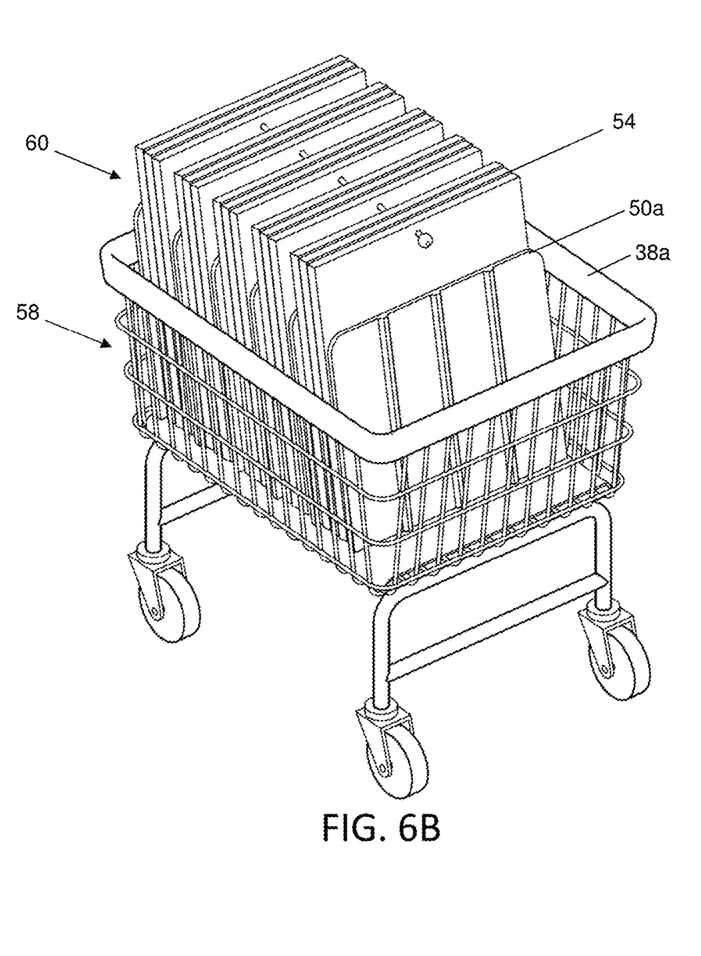

In operation, the panels are vertically positioned on the base in a stowed configuration, as shown in FIGS. 1B and 6B. When a sidewall is provided along the perimeter of the base, it is preferred that the sidewall height is less than the greatest panel dimension, whether that be the panel width ($W_P$) or the panel length ($L_P$), so that a portion of each panel extends past the top edge of the sidewall when the panels are stowed. Accordingly, a customer can view the top portions of the panels without obstruction. Further, it will be appreciated that the panel width and length are respectively less than the base width and length ($W_P<W_B$, $L_P<L_B$) so that the panels can be effectively stowed atop the base regardless of whether a sidewall is provided.

To further view the panels within the cart, a viewer may flip through the vertically stacked panels wherein the panels at least partially lay on top of one another atop the base. As shown in FIG. 1B, it is preferred that the panels are arranged like dominos such that if the panels were perfectly upright, each panel would be separated by a distance. Thus, a customer can flip through the set of panels to get a better view of each individual panel even when they are stowed atop the base. Alternatively, when no sidewalls or baffles are provided, it will be appreciated that the panels could be stacked on top of on another rather than standing substantially on end as described in the preferred embodiment.

Although a customer can effectively view the panels when stowed atop the base, it is another aspect of the mobile cart described herein to allow the user to remove one or more panels from the stowed configuration 28 and place them on the floor around the mobile cart for easier viewing or otherwise inspect them more closely in a display configuration 30, such as shown in FIGS. 3A, 3B and 3C. However, it is also an aspect of the invention to restrict the distance that a panel may be removed from the basket and prevent customers from walking away with panels that collectively makeup a complete display.

Figure 2:
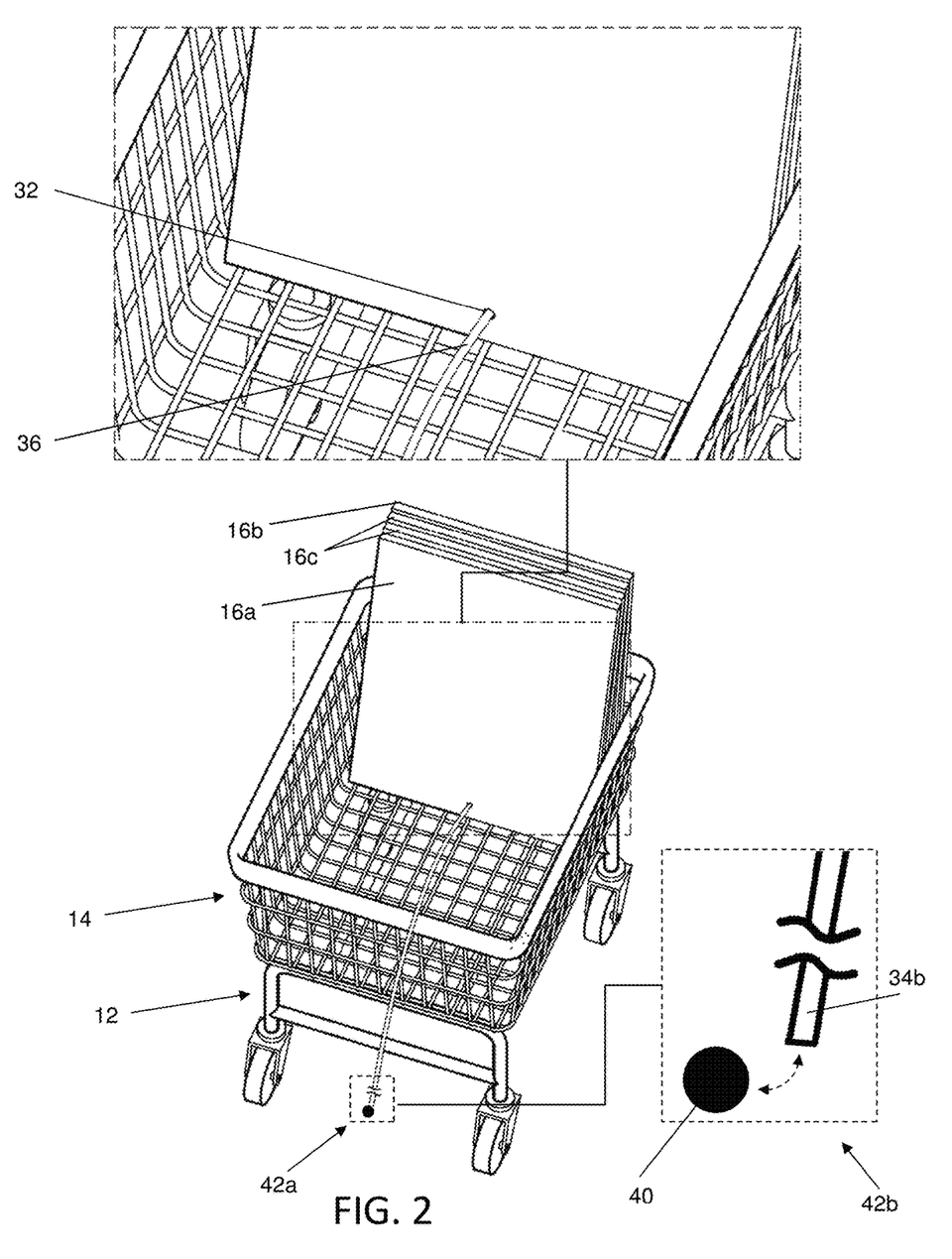
FIG. 2 shows a detail view of the panels stowed within the mobile display according to the invention described herein.
Figures 4A, 4B:
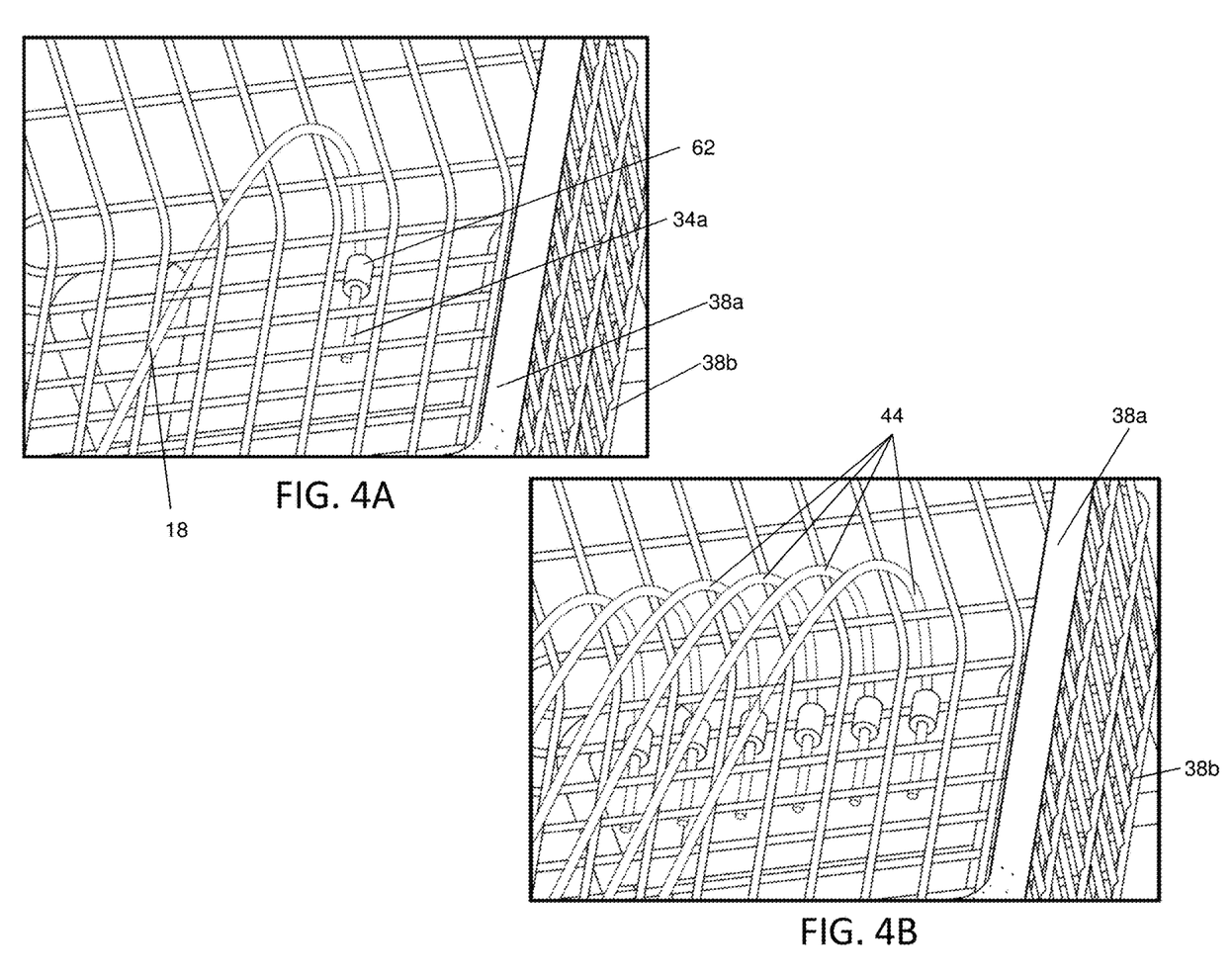
FIGS. 4A and 4B show detail views of a single and multiple cord embodiment according to the invention described herein.

To allow such display outside of the cart while still preventing users from taking panels away from the display, a cord 18 is provided having a proximal end 34a connects to the base with a fastener 62 as particularly in FIG. 4A. In an alternative embodiment, the cord could connect to the frame rather than the base. The cord extends a cord length ($L_C$) from the proximal end connected to the cart to the free distal end 34b. To connect each panel to the cord in the preferred embodiment, a hole 32 is provided in each panel proximate to their respective bottom edge and the length 36 of the cord is strung through the series of holes in the panels such as shown in FIG. 2. Accordingly, the length of the cord permits at least one of the panels to be removed from the base and spaced a distance ($D_P$) therefrom in the displayed configuration. Thus, the length of the cord is at least as great as the width of the planar base plus the height of the frame ($L_C \geq W_B+H_F$) when no sidewall is provided around the perimeter of the base and is at least as great as the width of the base plus the sidewall height plus the frame height ($L_C \geq W_B+H_F+H_S$) when a sidewall is provided so that the panels can reach the ground around the cart when displayed while still remaining connected to the cart by the cord.

When one or more panels are removed from the base and displayed, the free distal end of the cord can be removed from the base and one or more of the panels can translate along the length of the cord and be positioned on the floor around the display or held by the customer or salesperson for closer viewing. However, a fastener 40, such as a lock or plug, is provided on the distal end of the cord to prevent the panels from sliding off the end of the cord and being separated from the cart when fastened 42a. Alternatively, the fastener can be unfastened 42b and the panels can be removed from the cord and cart all together, such as when a sales person necessarily needs to swap panels out of the cart or add new panels when new product lines are available.

The panels themselves are substantially planar and may be preformed flooring sections with apertures drilled therein. Alternatively, the panels may be blank and customizable by the user such that a flooring sample, such as a carpet or linoleum sample, can be affixed to the panel and displayed according to the invention described herein. For example, a carpet sample may be connected to a panel with a hook and loop, adhesive or another similar fastener and displayed for a period of time. Subsequently, the sales person can swap out the carpet sample for another carpet sample without necessarily removing the panel from the display as described herein. In either case, it is an aspect of the invention to prevent customers from separating the panel from the display cart.

The set of panels include a pair of end panels 16a and 16b respectively positioned adjacent to the distal free end of the cord and the proximal end of the cord connected to the cart with the plurality of other panels 16c positioned between the end panels. Accordingly, the customer can remove each and every panel from the base with each panel respectively translating along the length of the cord as shown in FIGS. 3A, 3B and 3C. Alternatively, it will be appreciated that the slack in the cord allows for a single panel to be removed from the basket without removing the other panels, such as shown in FIGS. 3A and 3C.

In the alternative embodiment shown in FIG. 4B, multiple cords 44 may be used with each panel having its own corresponding cord. In such an embodiment each cord has its own proximal end connected to the cart opposite from the distal end that is connected to the aperture in the corresponding panel. In operation, the panels can be removed from the base and displayed around the cart while remaining connected to the cart by their corresponding cord. Accordingly, this alternative embodiment still effectively allows flooring samples to be displayed in a movable cart such that the sample panels can be quickly removed and displayed on the floor around the mobile display and subsequently stored back in the display when viewing is complete while still preventing customers from permanently separating panels from the cart.

Regardless of whether one or more cords are used, embodiments of the mobile cart described herein may integrate a cord recoil assembly 46, such as shown in FIG. 5, to remove slack from the cord or set of cords. When integrated with the invention described herein, it is preferred that the recoil assembly is mounted to the bottom surface of the base or to the frame to leave ample room atop the base for stowing panels. In operation, the proximal end of the cord or cords is received within the assembly along with a portion of the cord 48 that is automatically recoiled within the assembly when the panel is stowed. Subsequently, when the user or sales person wishes to remove a panel from the cart and display it around the cart, the panel can be removed and the recoil assembly can release the portion of the cord previously recoiled therein to allow ample slack for the user to separate the panel from the cart when the panel is displayed. Thus, the recoil assembly can be used to eliminate unnecessary slack in the cord or cords and thus provide a more aesthetically pleasing display as well as a more functional display where unnecessary slack does not need to be coiled or otherwise arranged atop the base when the panels are stored.

To further support the panels atop the base and prevent the panels from toppling over when stowed, particularly when no sidewall is provided, baffles 50 can also be attached on the top surface of base as illustrated in FIG. 6A. Each baffle is connected to the top of the base along at their lower ends 50b and extend a baffle height ($H_b$) upwards to respective top ends 50a. Further, the baffles preferably extend a baffle length ($L_b$) between opposing edges 56 of the base and are spaced a slot distance ($D_S$) from one another. In operation, one or more panels are stowed within the slots 52 between adjacent baffles and are thereby further supported atop the base. When baffles are used in carts that have sidewalls along the perimeter of the base, it will be appreciated that the height of the baffle is less than the greatest panel dimension ($H_b < L_p, W_p$) so that the edge of the panel 54 extends beyond the top edge of the baffle and can be easily viewed by the customer. Furthermore, the baffles may also a pivot mechanism to allow easier flipping of panels for the customer rather than a fixed baffle that does not pivot.

Further, the wire mesh material may provide integrated baffles wherein the bottom edge of each panel sits between two cross members of the wire mesh that extend between the sidewalls of the basket. Regardless of the embodiment chosen, it is an aspect of the invention for at least one panel to sit within a baffle so that the panels remain in a substantially upright position and do not slip to a horizontal position within the basket wherein they cannot be readily flipped through. If more panels are used within a display than baffles provided, it will be appreciated that multiple panels can be situated within a slot between the adjacent baffles, such as shown in FIG. 6B.

In another alternative embodiment of the mobile display described herein and shown in FIG. 1B, a scrap basket 62 can be connected to the frame and can be used to house unattached panel pieces 64 or scrap material that is intended to be taken home by the customer. Thus, the panels cannot be removed from the cart as they are connected to the display with the cord, but a customer can still take home a scrap piece of material for viewing in their home or other locations.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. For example, the basket portion the display described herein may be replaced with a hanging support wherein the panels are hung from hangers rather than situated within a basket, such as described in U.S. Pat. No. 3,472,387. Alternatively, the basket may be replaced with a center rod wherein each panel is connected to the center rod and cords are housed within the body of the rod as a variation of the device shown and described in U.S. Pat. No. 4,938,364. Thus, the breadth and scope of the present invention should not be limited by any of the above-described exemplary embodiments, but should be defined only in accordance with the following claims appended hereto and their equivalents.

What is claimed is:

1. A mobile display cart, comprising:
   a frame comprising an upper section and a lower section;
   a set of wheels connected to the lower section of the frame;
   a substantially planar base extending a length and a width within a perimeter, wherein the planar base has a topside and a bottom side, and wherein the base is attached to the upper section of the frame;

a set of panels positioned on the topside of the planar base in a stowed configuration, wherein each one of the panels in the set of panels comprises an aperture, wherein at least one of the panels in the set of panels is removed from the planar base in a display configuration; and a cord extending a cord length between a proximal end and a distal end, wherein the cord length is greater than the length of the planar base, wherein the proximal end is fixedly connected to at least one of the frame and the base, wherein a section of the cord extends through at least one aperture in one panel in the set of panels and connects the one panel to at least one of the planar base and the frame, and wherein the cord length permits the one panel to be spaced from the planar base by a distance at least as great as the width of the planar base when in the display configuration.

2. The cart of claim 1, wherein the set of panels comprise a pair of end panels and a plurality of panels between the pair of end panels, wherein the cord extends through each one of the apertures in the set of panels, wherein the proximal end of the cord is positioned proximate to a first panel in the pair of end panels, and wherein the distal end of the cord is positioned proximate to a second panel in the pair of end panels.

3. The cart of claim 2, wherein the distal end of the cord comprises a fastener, wherein the fastener moves between a fastened position and an unfastened position, wherein the distal end of the cord can freely pass through each one of the apertures in the set of panels when the fastener is in the unfastened position, and wherein the distal end of the cord is inhibited from passing through any of the apertures in the set of panels when the fastener is in the fastened position.

4. The cart of claim 1, wherein the cord is comprised of a set of cords respectively corresponding to the set of panels, wherein the distal end of each cord in the set of cords is fixedly connected through the apertures in a corresponding panel in the set of panels and connects the corresponding panel to at least one of the planar base and the frame.

5. The cart of claim 1, wherein the planar base further comprises a sidewall attached along the perimeter at a lower end of the sidewall, wherein the sidewall extends a sidewall height upwards to a top end of the sidewall above the topside of the base, wherein the sidewall height is at least as great as the width of the base, and wherein the cord length is greater than the sidewall height plus the length of the base plus the width of the base.

6. The cart of claim 1, wherein the frame further comprises a frame height between the set of wheels and the base, and wherein the frame height is less than the cord length.

7. The cart of claim 1 further comprising a set of baffles respectively connected to the topside of the base, wherein each baffle in the set of baffles respectively connects to the topside at a lower end of the baffle and extends a baffle height upwards to a top end of the baffle above the topside of the base, wherein each baffle in the set of baffles respectively extends a baffle length between a pair of opposing edges of the perimeter and are spaced a slot distance from at least one adjacent baffle, wherein each panel in the set of panels are respectively situated in a slot between adjacent baffles in the stowed configuration, and wherein at least one of the panels in the set of panels is removed from the slot in the display configuration.

8. The cart of claim 1 further comprising a cord recoil assembly mounted to one of the base and the frame, wherein the cord recoil assembly receives the proximal end of the cord and a portion of the length of the cord in the stowed configuration, wherein the cord recoil assembly releases the portion of the length of the cord in the display configuration, wherein the distal end of the cord is spaced a first distance from the cord recoil assembly in the stowed configuration and spaced a second distance from the cord recoil assembly in the display configuration, and wherein the first distance is less than the second distance.

9. The cart of claim 1, wherein the set of panels further comprise a panel width and a panel length, wherein the panel width is less than the width of the planar base, and wherein the panel length is less than the length of the planar base.

10. The cart of claim 1 further comprising a scrap basket connected to the frame between the upper section and the lower section, and wherein a plurality of scrap panels are removably stored in the scrap basket.

11. A mobile cart for holding and displaying a set of panels, comprising:

a frame comprising an upper section and a lower section;

a set of wheels connected to the lower section of the frame;

a substantially planar base extending a length and a width within a perimeter, wherein the planar base has a topside and a bottom side, wherein the base is attached to the upper section of the frame, wherein the set of panels are adapted to be positioned on the topside of the planar base in a stowed configuration, and wherein at least one of the panels in the set of panels is adapted to be removed from the planar base in a display configuration; and a cord extending a cord length between a proximal end and a distal end, wherein the cord length is greater than the length of the planar base, wherein the proximal end is fixedly connected to at least one of the frame and the base, wherein each one of the panels in the set of panels is configured to have an aperture, wherein a section of the cord extends through at least one aperture in one panel in the set of panels and connects the one panel to at least one of the planar base and the frame, and wherein the cord length permits the one panel to be spaced from the planar base by a distance at least as great as the width of the planar base when in the display configuration.

12. The mobile cart of claim 11, wherein the planar base further comprises a sidewall attached along the perimeter at a lower end of the sidewall, wherein the frame further comprises a frame height between the set of wheels and the base, wherein the sidewall extends a sidewall height upwards to a top end of the sidewall above the topside of the base, wherein the sidewall height and the frame height is at least as great as the width of the base, and wherein the cord length is greater than the frame height plus the sidewall height.

13. The mobile cart of claim 12, further comprising a set of baffles respectively connected to the topside of the base, wherein each baffle in the set of baffles respectively connects to the topside at a lower end of the baffle and extends a baffle height upwards to a top end of the baffle above the topside of the base, wherein each baffle in the set of baffles respectively extends a baffle length between a pair of opposing edges of the perimeter and are spaced a slot distance from at least one adjacent baffle, wherein each panel in the set of panels are respectively configured to be situated in a slot between adjacent baffles in the stowed configuration, and wherein at least one of the panels in the set of panels is adapted to be removed from the slot in the display configuration.

14. The mobile cart of claim 12, wherein the set of panels is adapted to further comprise a panel width and a panel length, wherein the panel width is less than the width of the planar base, and wherein the panel length is less than the length of the planar base.

15. The mobile cart of claim 12, wherein the set of panels is adapted to further comprise a pair of end panels and a plurality of panels between the pair of end panels, wherein the cord extends through each one of the apertures in the set of panels, wherein the proximal end of the cord is positioned proximate to a first panel in the pair of end panels, and wherein the distal end of the cord is positioned proximate to a second panel in the pair of end panels.

16. The mobile cart of claim 15, wherein the distal end of the cord comprises a fastener, wherein the fastener moves between a fastened position and an unfastened position, wherein the distal end of the cord can freely pass through each one of the apertures in the set of panels when the fastener is in the unfastened position, and wherein the distal end of the cord is inhibited from passing through any of the apertures in the set of panels when the fastener is in the fastened position.

17. A mobile display cart, comprising:
a frame comprising an upper section and a lower section;
a set of wheels connected to the lower section of the frame;
a substantially planar base extending a length and a width within a perimeter, wherein the planar base has a topside and a bottom side, and wherein the base is attached to the upper section of the frame;
a set of panels positioned on the topside of the planar base in a stowed configuration, wherein at least one of the panels in the set of panels is removed from the planar base in a display configuration; and
a set of cords respectively corresponding with the set of panels, wherein each cord in the set of cords extends a cord length between a proximal end and a distal end, wherein the cord length is greater than the length of the planar base, wherein the proximal end is fixedly connected to at least one of the frame and the base, wherein the distal end is fixedly connected to one panel in the set of panels and connects the one panel to at least one of the planar base and the frame, and wherein the cord length permits the one panel to be spaced from the planar base by a distance at least as great as the width of the planar base when in the display configuration.

18. The cart of claim 17, wherein the planar base further comprises a sidewall attached along the perimeter at a lower end of the sidewall, wherein the sidewall extends a sidewall height upwards to a top end of the sidewall above the topside of the base, wherein the sidewall height is at least as great as the width of the base, and wherein the cord length is greater than the sidewall height plus the length of the base plus the width of the base.

19. The cart of claim 17, wherein the set of panels further comprises a panel width and a panel length, wherein the panel width is less than the width of the planar base, and wherein the panel length is less than the length of the planar base.

20. The cart of claim 17 further comprising a cord recoil assembly mounted to one of the base and the frame, wherein the cord recoil assembly receives the proximal end of each cord in the set of cords and a portion of the length of each cord in the set of cords in the stowed configuration, wherein the cord recoil assembly releases the portion of the length of each cord in the set of cords in the display configuration, wherein the distal end of each cord in the set of cords is spaced a first distance from the cord recoil assembly in the stowed configuration and spaced a second distance from the cord recoil assembly in the display configuration, and wherein the first distance is less than the second distance.

* * * * *